United States Patent
McGee

(10) Patent No.: US 9,477,250 B2
(45) Date of Patent: Oct. 25, 2016

(54) SUPER CAPACITOR AND CHARGER FOR SECONDARY POWER HAVING LONGEVITY FEATURES

(71) Applicant: SERVICE SOLUTIONS U.S. LLC, Warren, MI (US)

(72) Inventor: Phillip McGee, Owatonna, MN (US)

(73) Assignee: Bosch Automotive Service Solutions Inc., Warren, MI (US)

(*) Notice: Subject to any disclaimer, the term of this patent is extended or adjusted under 35 U.S.C. 154(b) by 731 days.

(21) Appl. No.: 13/803,996

(22) Filed: Mar. 14, 2013

(65) Prior Publication Data

US 2014/0265553 A1    Sep. 18, 2014

(51) Int. Cl.
| G06F 1/26 | (2006.01) |
| G05F 3/10 | (2006.01) |
| B60L 11/18 | (2006.01) |

(52) U.S. Cl.
CPC ............ G05F 3/10 (2013.01); B60L 11/1809 (2013.01)

(58) Field of Classification Search
CPC ......... G05F 3/10; H02J 7/00; Y10T 307/625
See application file for complete search history.

(56) References Cited

U.S. PATENT DOCUMENTS

| 7,379,282 B1* | 5/2008 | Zansky ............... H02J 1/108 361/18 |
| 7,772,720 B2* | 8/2010 | McGee et al. .................. 307/66 |
| 8,018,094 B1* | 9/2011 | Jai et al. ........................ 307/80 |
| 8,041,456 B1* | 10/2011 | Blackwell et al. ........... 700/245 |
| 2006/0197507 A1* | 9/2006 | Wang .............................. 320/166 |
| 2009/0289607 A1* | 11/2009 | Mentelos ....................... 320/166 |

FOREIGN PATENT DOCUMENTS

JP    2011-103634 A    5/2011

OTHER PUBLICATIONS

International Search Report and Written Opinion mailed Jul. 3, 2014 in International Application No. PCT/US2014/027725.
International Search Report issued in PCT/US2014/027725 dated Jul. 3, 2014.

* cited by examiner

*Primary Examiner* — Thienvu Tran
*Assistant Examiner* — Pinping Sun
(74) *Attorney, Agent, or Firm* — Baker & Hostetler LLP

(57) ABSTRACT

A secondary power source system for a communication device includes a charging unit configured to receive a primary power input and restrict a current used for charging to a predetermined amount. The current is part of a first output of the charging unit. The system further includes a storage unit including a device that stores electrical energy, the storage unit configured to receive the first output from the charging unit with restricted current and generate a second output, a regulating unit configured to receive the second output from the storage unit and generate a third output, a selector unit configured to perform a logical OR operation with the primary power input, the first output from the charging unit and third output from the regulating unit, and to generate a fourth output, and a shutdown unit configured to shutdown operation of the secondary power system when the storage unit has been expended.

14 Claims, 8 Drawing Sheets

SUPER CAPACITOR AND CHARGER FOR SECONDARY POWER HAVING LONGEVITY FEATURES

FIELD OF THE INVENTION

The invention relates generally to a power source having longevity features. More particularly, the invention relates to a secondary power source and charger for the secondary power source having longevity features.

BACKGROUND OF THE INVENTION

Currently, when there is an interruption in the power supply to a vehicle or a device connected to the vehicle, many of the on-board devices of the vehicle or the circuitry in the device connected to the vehicle can be affected. This is especially important with regard to logic circuits or other memory type devices on a communication device that require an uninterrupted power supply in order to maintain either the data in the memory, the settings in the system, power to accommodate communication between a computing device connected to the vehicle, or the like.

For example, when the primary power supply is reduced or shutoff, the settings and data in memory can be lost, especially if it is a random access memory, which requires a constant power supply to maintain settings and data. Therefore, when there is a power loss, the memory unit loses all the information.

Circuitry within a communication device accommodating connection between a diagnostic tool or a personal computer connected to a vehicle or the circuitry within the vehicle that draws power from the main power is reliant on the main power. A backup power system can be added to a device, however, this increases the cost and there are issues with the size and replacement of the backup power and the time it takes to charge the backup power. Further, if the device or circuits that need the backup power are small, then it is difficult to provide the backup power within the housing of the device or circuits.

Further, there is the issue of maintaining the proper power supply to the circuits and logic circuits as the power supply must be maintained at a certain level so that the logic circuits are not damaged. It is critical that the supply does not vary much from the parameters of the circuits, because the logic circuits are very sensitive to the power that is provided.

Interruption of the power supply can be catastrophic as there can be loss of data and even the malfunctioning of an electrical device, because the power has been interrupted, even if it is for a short period of time. As mentioned above, the loss of power can reset the device, which may cause problems if certain customized settings were used. Specifically, there can be major data loss, including data collected over a long period of time, which can cause major delays and problems in rectifying the situation.

A number of prior approaches to address the above noted needs have utilized capacitors as secondary power sources. However, the use of capacitors as secondary power sources can present a number of problems as the capacitors have highly fluctuating output voltages. In this regard, as the prior art approaches drop in voltage output, the result is that the secondary power sources internally determine that the one or more capacitors of the secondary power source have now been expended. The secondary power source may then take the appropriate steps to shut down only to secondarily and incorrectly determine that the power source is not expended due to a voltage increase from the now unloaded capacitor. However, the secondary power source will provide a load to the capacitors, the voltage will drop significantly, and again the power source will internally determine that the capacitors have been expended and will again start the shutdown process. This cycle of shutting down and erroneously restarting the secondary power source can typically repeat many times affecting the longevity of the secondary power source.

Accordingly, it would be desirable to provide an electrical energy storage unit and charger as a secondary power with a processing device to avoid repeated shutdown and restarting processes to increase longevity.

SUMMARY OF THE INVENTION

The foregoing needs are met, to a great extent, by the invention, wherein one aspect of an apparatus is provided that in some embodiments to provide an electrical energy storage unit and charger as a secondary power to a device having a longer useful life.

In one aspect a secondary power source system for a communication device includes a charging unit configured to receive a primary power input and restrict a current used for charging to a predetermined amount, wherein the current is part of a first output of the charging unit, a storage unit comprising a device that stores electrical energy, the storage unit configured to receive the first output from the charging unit with restricted current and generate a second output, a regulating unit configured to receive the second output from the storage unit and generate a third output, a selector unit configured to perform a logical operation with the primary power input, the first output from the charging unit and third output from the regulating unit, and to generate a fourth output, and a shutdown unit configured to shutdown operation of the secondary power source system when the storage unit has been expended.

In another aspect a secondary power source system for a device communicating between a vehicle and a computing device includes a means for charging receiving a primary power input and restricting a current used for charging to a predetermined amount, wherein the current is part of a first output of the means for charging, a means for providing capacitance being charged by the first output of the means for charging and generating a second output, a means for regulating a voltage generating a third output from the second output from the means for providing capacitance, a means for selecting between the primary power input, the first output from the means for charging, and the third output from the means for regulating the voltage, and to generate a single fourth output, and a means for shutting down operation of the secondary power source system when the means for providing has been expended.

In a further aspect, a method of providing a secondary power source to a communication device includes receiving a primary power input and restricting a current used for charging to a predetermined amount by a charging unit, wherein the current is part of a first output of the charging unit, receiving the first output from the charging unit with restricted current and storing a power in a storage unit including a capacitance unit, generating a second output by the storage unit, receiving the second output from the storage unit by a regulating unit, generating a third output by the regulating unit, selecting between the primary power input, the first output from the charging unit, and the third output from the regulating unit to generate a fourth output, and shutting down operation of the secondary power source when the storage unit has been expended.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
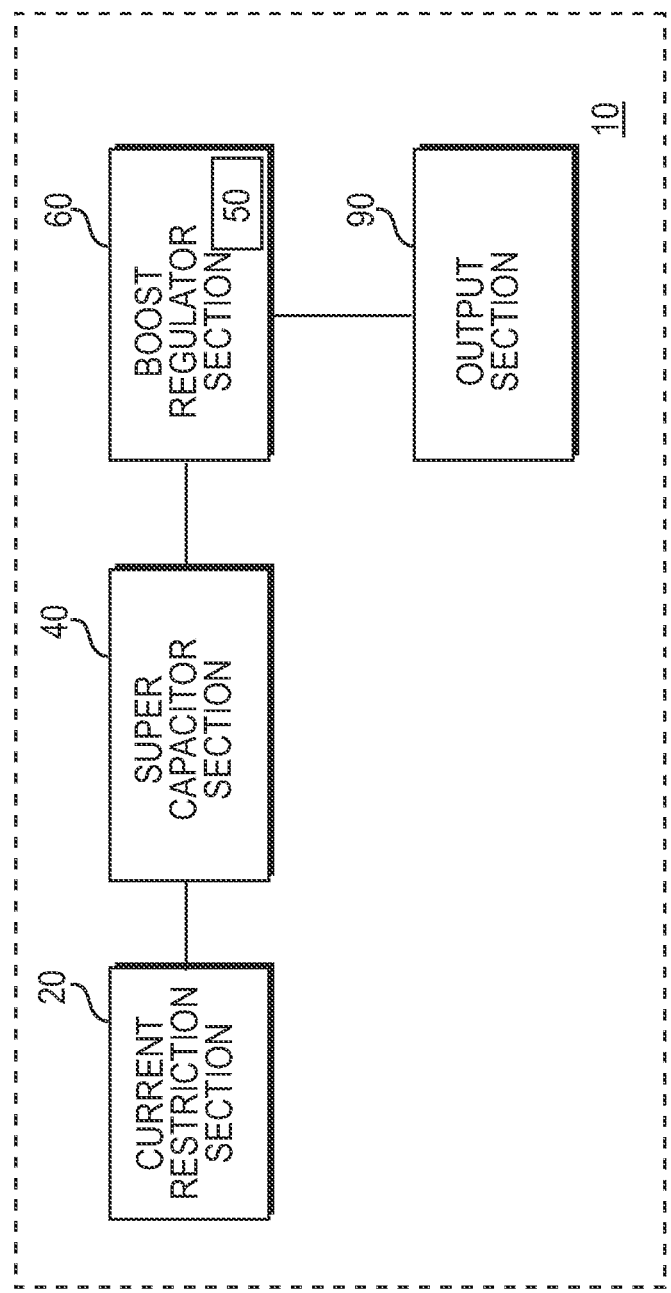
FIG. 1 is a block diagram of a power unit according to an embodiment of the invention.

The invention will now be described with reference to the drawing figures, in which like reference numerals refer to like parts throughout. An embodiment in accordance with the invention includes a secondary power supply that provides an uninterrupted power supply. The invention provides an electrical energy storage unit and charger that supply electrical energy as secondary power. The invention includes the use of capacitors including super capacitors that have to be charged. Moreover, the invention provides a shutdown circuit to increase the longevity of the secondary power supply.

Figure 2:
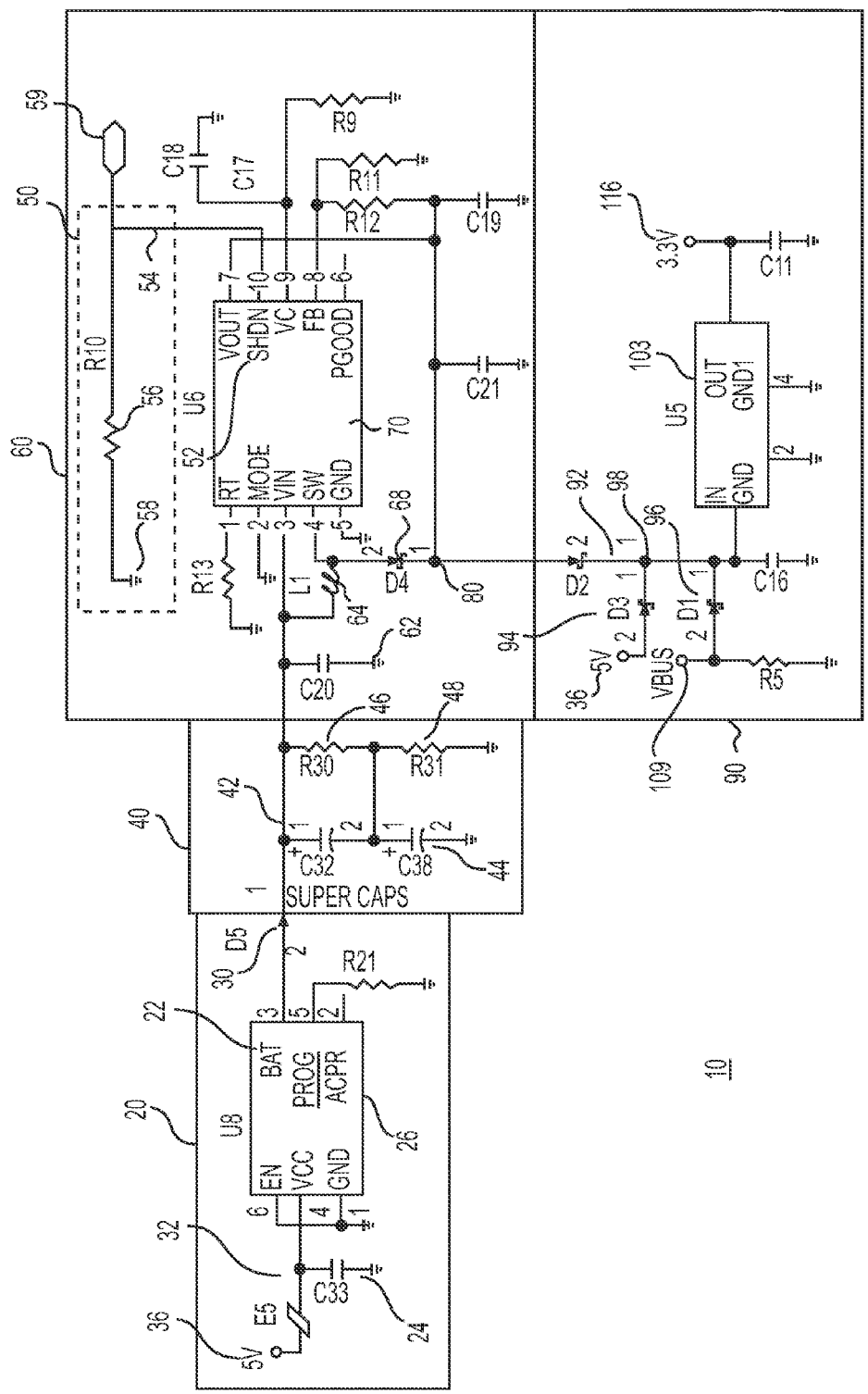
FIG. 2 is a schematic providing exemplary detail of the block diagram of FIG. 1.

FIG. 1 is a block diagram of a power unit according to an embodiment of the invention; and FIG. 2 is a schematic providing exemplary detail of the block diagram of FIG. 1. As shown in FIG. 1 and FIG. 2, a current restriction section 20 takes a 5 V DC (volt direct current) DC rail 36 (shown in FIG. 2) and uses the DC rail 36 to charge super capacitors of the super capacitor section 40. Other voltages can also be used, 5 V is only an example and is not meant to be limiting.

The current restriction section 20 may restrict the amount of current used for charging to a current such as 200 mA (milli-amps) or other predetermined level. Other current levels can be used, but the current should be maintained at least at the predetermined level or within a certain variance from the predetermined level. The purpose of restricting the current is to at least maintain some level of safety during charging, otherwise the system will attempt to draw an excessive amount of current to immediately charge the super capacitors of the super capacitor section 40.

An inrush of power may potentially create sparking and could ignite flammable gases. Therefore, having the current restriction section 20 may help increase the safety and reliability of the secondary power unit 10.

Referring to FIG. 2, the DC rail 36 may feed into a linear charger 26. The linear charger 26 can charge batteries such as lithium ion, nickel-metal hydride, nickel cadmium, or other power chargeable devices such as super capacitors 42, 44. The linear charger 26 can have thermal regulation capabilities to maintain stability in the system. The linear charger 26 can be a constant current and constant voltage linear charger and can work for example with USB (Universal Serial Bus) power specifications. An external resistor, MOSFET (metal-oxide semiconductor field effect transistor) or blocking diode may not be required when using the linear charger 26 in the secondary power unit 10. When the 5 V DC rail 36 is removed, the linear charger 26 can automatically enter a low current state, dipping the battery current drain to less than the set current. When, however, the power is applied through the 5 V DC rail 36, the linear charger 26 can be placed into a mode where the supply current is at the set current. The power input for the linear charger 26 can include capacitance through a capacitor 24 at a node 32 between the linear charger 26 and the 5 V DC rail 36. The output to charge the battery (BAT) 22 may flow through a diode 30, which restricts the direction of the flow of current away from the linear charger 26 and into the super capacitor section 40.

The super capacitor section 40 may contain the super capacitors 42, 44. The super capacitors 42, 44 may be placed serially to increase their voltage handling capability. Other configurations and quantity of super capacitors can also be used.

A super capacitor stores energy by physically separating positive and negative charges, whereas a battery will perform such an activity on a chemical basis. The interior materials have a high surface area, aiding in the high density of energy that can be stored. An ultra capacitor can include a double-layer structure that polarizes an electrolytic solution to store energy electrostatically. Since there are no chemical reactions, the ultra capacitor is quick at charging and discharging like the super capacitors 42, 44. The invention can use either the ultra capacitor or the super capacitor.

The super capacitors 42, 44 can be two non-reactive porous plates or collectors, suspended within an electrolyte with a voltage potential applied across the collectors. Once the super capacitor is charged, any device may use its energy. The energy density is much higher than ordinary capacitors. For simplicity, the description will reference ultra capacitors and super capacitors generically as super capacitors.

The physical actions in the super capacitors 42, 44 aid in the fast release of energy and the fast charging of the capacitor. The super capacitors 42, 44 can be placed in an RC circuit with resistors 46 and 48, with the output going into the boost regulator section 60.

The boost regulator section 60 may be a boost regulator to generate, for example, 4.6 V DC. Other voltages can be generated depending on the application of the secondary power unit 10. In this example, the 4.6 V DC voltage is utilized so that the 5 V DC rail may be provided preferentially in the diode logic ORing node in the output section 90.

The output from the super capacitor section 40 may be sent through a LC circuit of the super capacitor 44 and an inductor 64, and the input is entered into a synchronous boost converter 70. A Schottkey diode 68 may also be sent a signal from the inductor 64 and fed into the output node 80, which also receives the output from the synchronous boost converter 70. The synchronous boost converter 70 may be a step-up DC/DC converter that operates from a certain input voltage. The synchronous boost converter 70 can include a MOSFET switch and synchronous rectifier, for example. The Schottkey diode 68 may not be required but included in the example. The output from the output node 80 is fed into the output section 90.

The output section 90, ORs together the three different potential voltage sources so a single 3.3 V DC rail 116 can be generated. The DC rail 116 can be other voltages and the 3.3V DC is only shown as an example.

The output from the output node 80 may be sent through the Schottkey diode 92 and output to a node 98. The 5 V DC rail 36 and the bus voltage VBUS 109, also may meet at node 98 through the Schottkey diode 96. The 5 V DC rails 36, the bus voltage VBUS 109, and the 4.6 V DC from the boost regulator section 60 may be OR'd together to form a single 3.3 V DC output at node 98. The output from the node 98 may be sent to a low dropout regulator 103 which may be capable of supplying a certain current with a certain low dropout voltage, thus providing a stable output.

A shutdown section 50 may ensure that the synchronous boost converter 70, after properly determining the voltage of the super capacitors 42, 44 is too low to maintain regulated operation, from subsequently and erroneously restarting due to an apparent increased voltage provided by the super capacitors 42, 44 that are subsequently unloaded. More specifically, as the energy from the super capacitors 42, 44 is expended, the synchronous boost converter 70 may determine that the power in the super capacitors 42, 44 is too low to maintain regulated operation. Thereafter, the synchronous boost converter 70 can take the appropriate steps to discontinue operation. However, during this process of taking the appropriate steps to discontinue operation, the super capacitors 42, 44 are unloaded and may present an apparent increase in voltage. This apparent increase in voltage from the super capacitors 42, 44 could be misinterpreted by the synchronous boost converter 70 or other components of the secondary power unit 10 as being sufficient to maintain regulated operation and subsequently the synchronous boost converter 70 could restart. The shutdown section 50 prevents the misinterpretation by the synchronous boost converter 70 and allows the synchronous boost converter 72 to properly discontinue operation and shutdown. Accordingly, the shutdown section 50 prevents restarting of the secondary power unit 10 and increases longevity of the components therein.

In broader aspects, the shutdown section 50 isolates various components of the secondary power unit 10 from voltage fluctuations from the super capacitor section 40. In this regard, the shutdown section 50 may provide isolation of one or more of the components of the secondary power unit 10 from the voltage fluctuations from the super capacitor section 40. Additionally, the shutdown section 50 may isolate or address other issues with the shutdown process including fluctuations in voltage, current, power, or the like from any of the components within the secondary power unit 10. Moreover, the shutdown section 50 can address any other anomalies associated with the shutdown process and/or any other anomalies associated with low power, low voltage, low current, or the like in the secondary power unit 10 that can prevent or be problematic when shutting down the secondary power unit 10. Additionally, the shutdown section 50 may be configured to ensure that the secondary power unit 10 does not restart until power is provided to the super capacitor section 40, or the like.

In a particular aspect, the shutdown section 50 may isolate the synchronous boost converter 70. In one approach, the shutdown section 50 may isolate the shutdown input (SHDN) 52 to the synchronous boost converter 70. The isolation may take a number of different forms. In this regard, the isolation may include connecting the shutdown input 52 to a resistor 56 that is subsequently tied to ground 58. Additionally, the shutdown input (SHDN) 52 may also be connected to a reset button 59. Accordingly, a user can properly shutdown the secondary power unit 10 by actuating the reset button 59 to provide an input to the shutdown input 52. Additionally, when the power level in the super capacitors 42, 44 is too low to provide regulated power, the shutdown section 50 provides isolation and/or a grounded input and reference to prevent the secondary power unit 10 from sensing an increase in voltage from the super capacitors 42, 44 that are unloaded and misinterpreting the increase in voltage as a basis to restart the secondary power unit 10. Accordingly, the secondary power unit 10 may properly shut down when the power in the super capacitors 42, 44 is below a predetermined threshold. The shutdown section 50 may ensure the secondary power unit 10 remains shutdown until actual external power is provided to the secondary power unit 10. It should be noted that FIG. 2 is an exemplary configuration, other arrangements providing the same functionality are within the scope and spirit of the invention. Accordingly, the shutdown section 50 prevents restarting of the secondary power unit 10 and increases longevity of the components therein.

Figure 3:
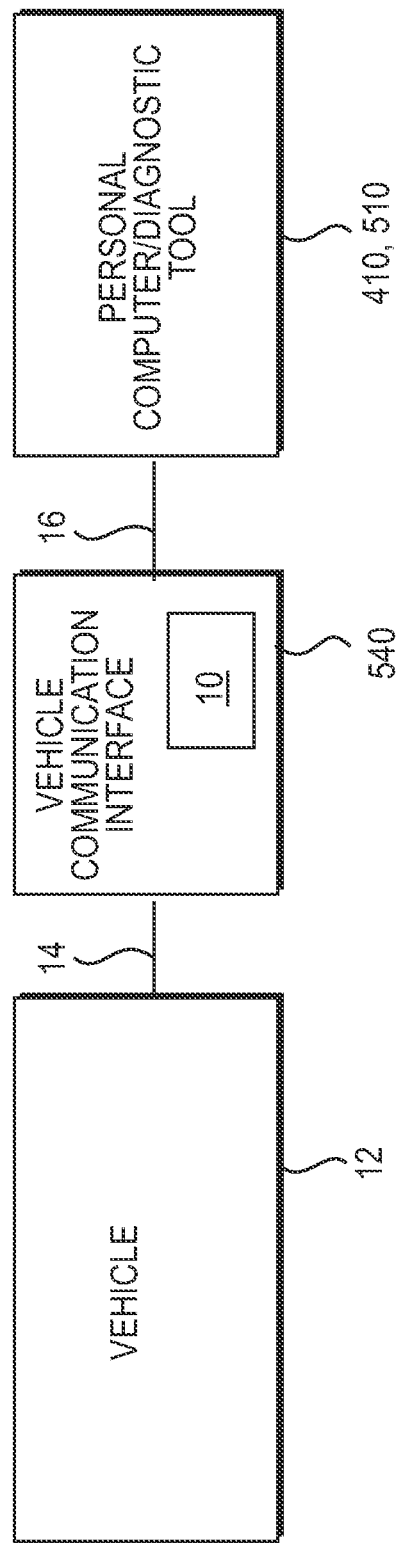
FIG. 3 is a diagram of the power unit having connections to a vehicle.
Figure 4:
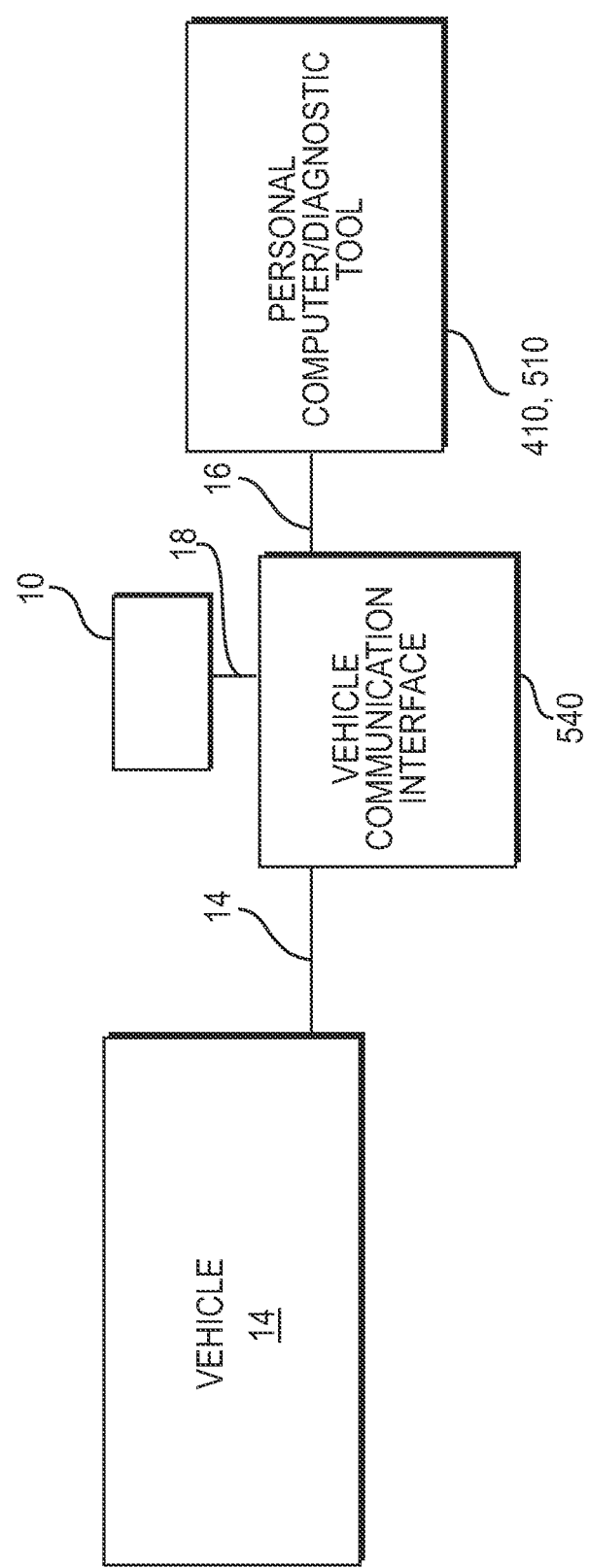
FIG. 4 is a diagram of the power unit having alternative connections to a vehicle.

Referring to FIGS. 3 and 4, the invention can limit the charge voltage and current to a specified level. The invention eliminates over-charging (which may cause damage) of the super capacitors 42, 44, and open arching when connecting to a vehicle 12. The invention is also used as a backup power source for any type of device, including, for example, a vehicle communication interface 540 that communicates between the vehicle 12 and a computing device, such as a diagnostic tool 510, a personal computer 410, handheld computer or the like, when the vehicle communication interface 540 is disconnected from the main power source of the vehicle. Also, data downloaded to the diagnostic tool 510 or personal computer 410 can be communicated despite a power loss.

FIG. 3 is a diagram of the power unit having connections to a vehicle; and FIG. 4 is a diagram of the power unit having alternative connections to a vehicle. Referring to FIGS. 3 and 4, for example, the vehicle 12 can provide the primary power to the vehicle communication interface 540. The secondary power unit 10 can be, either integrated into the vehicle communication interface 540 as seen in FIG. 3, or outside of the vehicle communication interface, and connected electrically through a link 18, as seen in FIG. 4. The diagnostic tool 510 or the personal computer 410 can be linked, either wirelessly, or through the wire, by link 16.

Further, the invention provides for regulated power to the device's core logic during reduced or removed voltage from a vehicle 12. This has a distinct advantage over using a battery due to the significantly reduced amount of charging time and current as shown above.

The secondary power unit 10 provides for a unit, such as a diagnostic tool 510 or personal computer 410, to communicate for at least a short period of time, independent of any other power source, with the vehicle 12. The independent power source is able to operate on-line with the vehicle 12 power source to allow the unit, such as a vehicle communication interface 540, an uninterrupted power source, for example, during cold cranking.

Applicable communications with the host, such as a vehicle 12 connected to the secondary power unit 10, are to be maintained during cold cranking. The blocks of circuitry that draw power from the 3.3 V DC rail 116 can receive power during cold cranking. This will allow the operation of, for example, RS232, USB (Universal Serial Bus), a BLUETOOTH module, or the like in addition to a microcontroller such as an S12X, RAM (Random Access Memory), a Serial Flash, such as non-volatile memory, or the like as seen in FIGS. 3 and 4 with the secondary power unit 10 and the vehicle communication interface 540. The software may need to shutdown unused host communication interfaces when not needed, as this will maximize the duration of operation for the tool during cold cranking, as the super-caps (super capacitors) 42 and 46 will be used to support this functionality.

Figure 5:
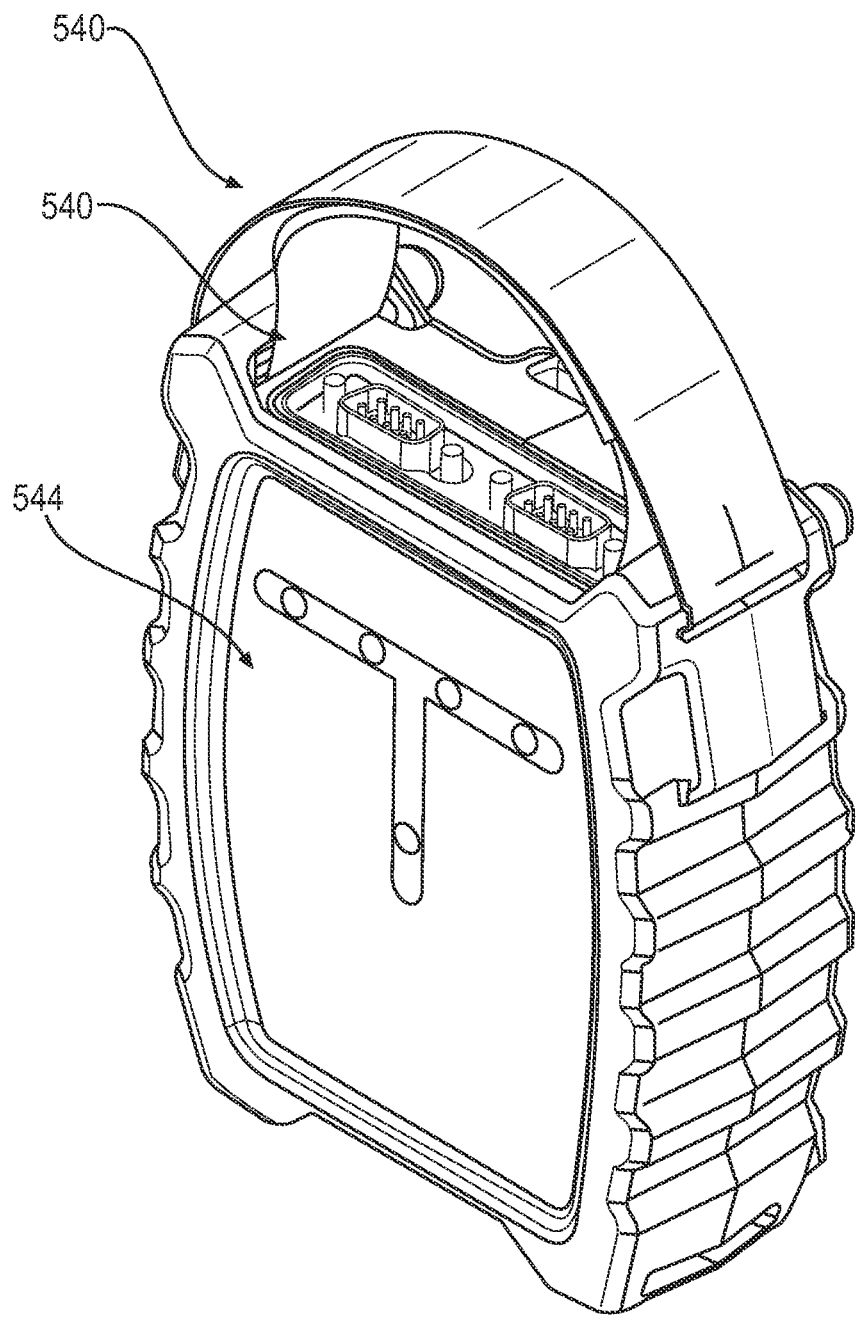
FIG. 5 is a front view of a vehicle communication interface according to the invention.

FIG. 5 is a front view of a vehicle communication interface according to the invention. In particular, FIG. 5 shows the vehicle communication interface 540 that may include or be connected to the secondary power unit 10. The vehicle communication interface 540 may be connected between the vehicle 12 or the device being tested with a connection 14 using one of the connectors 542. The vehicle communication interface 540 may also be connected to the diagnostic tool 510 or personal computer 410 with the link 16 using another one of the connectors 542. The vehicle communication interface 540 may further include various status indicators 544. The status indicators 544 may be a series of LEDs that provide indication of a status, power, error, or the like.

Figure 6:
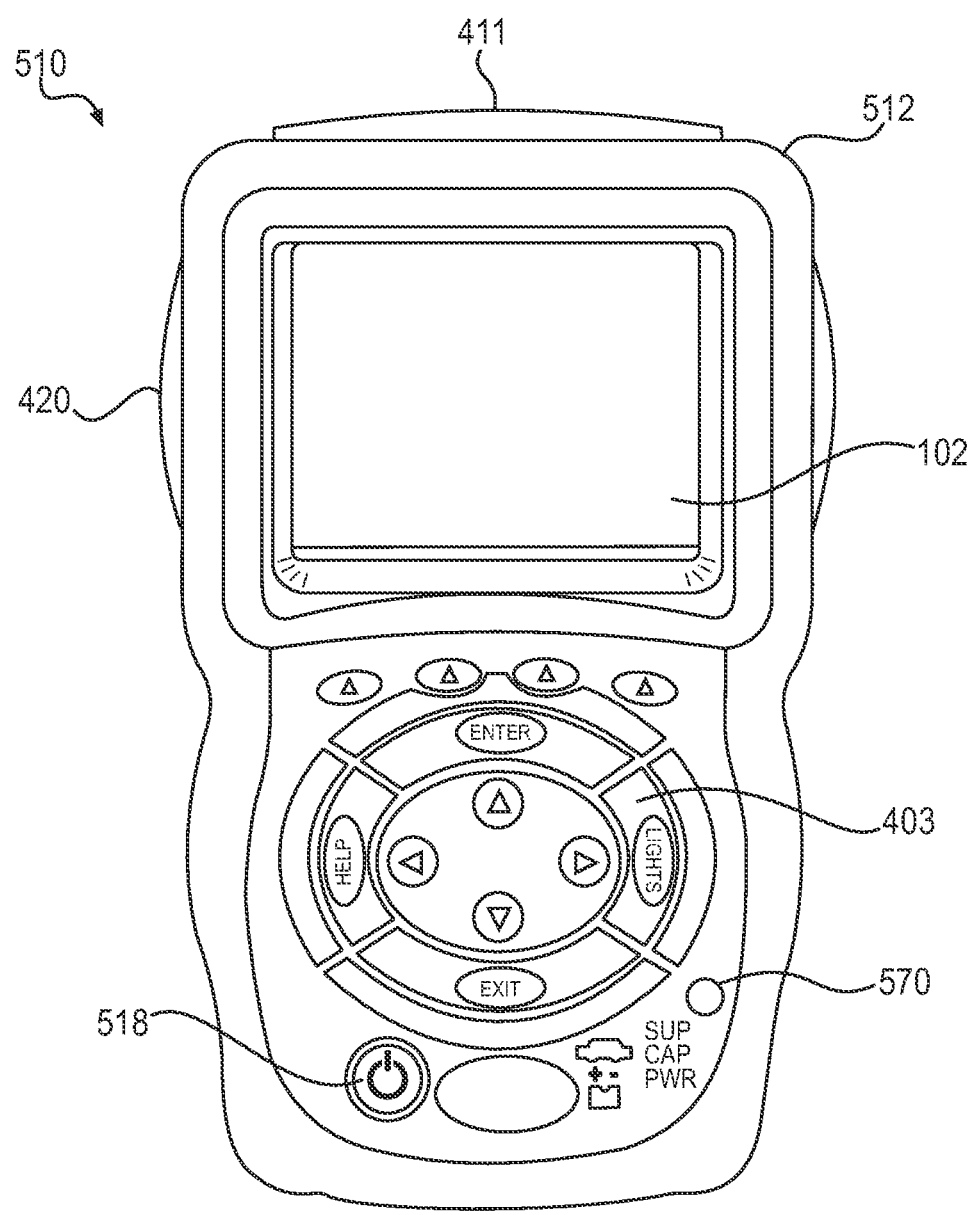
FIG. 6 is a front view of a diagnostic tool according to the invention.

FIG. 6 is a front view of a diagnostic tool according to the invention. Referring to FIG. 6, there can be an indicator signal labeled SUPCAP PWR 570 (connected to the processor 402) which indicates that the communication to the diagnostic tool 510 is being powered from the super-caps (super capacitors) 42, 44. The processor 402 may then have to ensure that it is prepared for a complete loss. The indicator for super capacitor power can also be located on the vehicle communication interface 540 itself, or on the personal computer 410 display 820.

Referring back to FIGS. 3 and 4, the secondary power unit 10 can be located in a plurality of different configurations as mentioned above. For example, as seen in FIG. 3, the secondary power unit 10 can be included in the vehicle communication interface 540, which is connected between the vehicle 12 or device being tested with connection 14 and the diagnostic tool 510 or personal computer 410.

Referring to FIG. 4, the secondary power unit 10 can be external to the vehicle communication interface 540 but connected to it, and the vehicle communication interface 540 or other communication interfaces are connected to a personal computer 410, or alternatively, the diagnostic tool 510.

Figure 7:
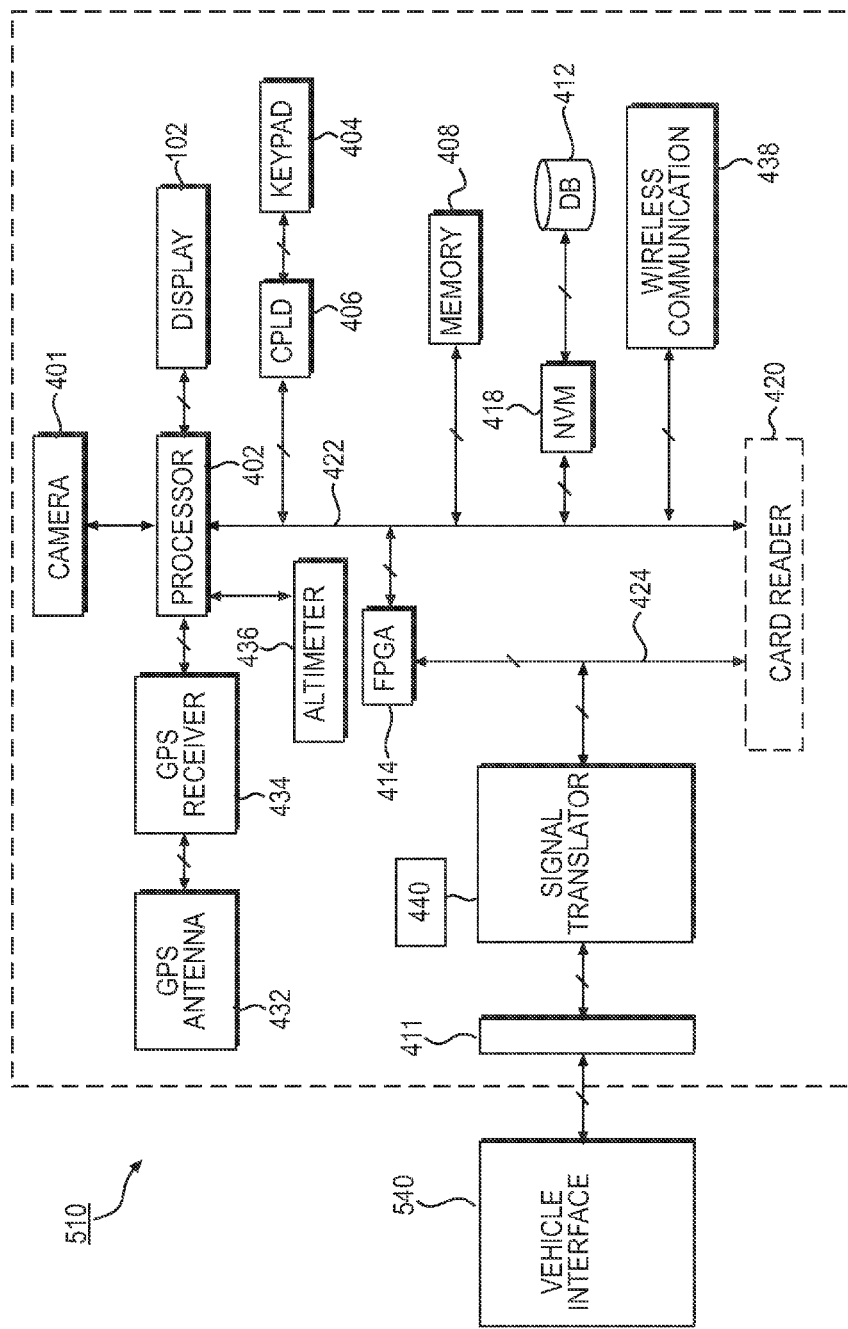
FIG. 7 is an exemplary block diagram of a circuit that may be utilized with the diagnostic tool of FIG. 6.

FIGS. 6 and 7 show details of exemplary diagnostic tools 510 of FIGS. 3 and 4. Manufacturers have programmed their vehicle onboard computers with complicated methods of detecting a variety of problems. Further, the United States Environmental Protection Agency has mandated that DTCs be set where there are emissions related problems with the vehicle using the Onboard Diagnostic II System, also known as the OBD II system.

However, there are still problems of using the diagnostic tool since there are limitations in troubleshooting the actual cause of the functional anomaly of the diagnostic tool. A user is forced to look at the diagnostic tool's limited display that may display only the DTC or simple indicator of function being performed, and a message indicating a communication failure.

In an embodiment of the invention, the diagnostic tool will run an application that accommodates the tool recording the cable used, the exact vehicle configuration that was entered, records communication transmissions and responses, hardware configuration, etc. If the diagnostic tool does not respond as anticipated, the user can indicate such information and communicate such information to a technical service line for interpretation. The information will then help determine if the user had incorrectly configured the tool for the vehicle (incorrect cable, wrong information entered, etc.). Automation of some or the entire process can also be performed.

FIG. 6 is a front view illustrating a diagnostic tool 510 according to an embodiment of the invention. The diagnostic tool 510 includes a housing 512 to encase the various components of the diagnostic tool 510, such as a display 102, a user interface 403 associated with the keypad input circuit 404 shown in FIG. 7, a power button 518, a memory card reader 420 and a connector interface 411. The display 102 can be any type display, including, for example, but not limited to, a liquid crystal display (LCD), organic light emitting diode (OLED), field emission display (FED), electroluminescent display (ELD), etc. In addition, the LCD, for example, can be touch screen that both displays and performs the additional task of interfacing between the user and the diagnostic tool 510. The user interface 403 allows the user to interact with the diagnostic tool 510, in order to operate the diagnostic tool as the user prefers. The user interface 403 can include function keys, arrow keys or any other type of keys that can manipulate the diagnostic tool 510 in order to operate the diagnostic tool through the software. The input device or user interface 403 can also be a mouse or any other suitable input device for the user interface 403, including a keypad, touchpad, etc. The user interface 403 can also include keys correlating to numbers or alphanumeric characters. Moreover, as mentioned above, when the display 102 is touch sensitive, the display 102 can supplement or even substitute for the user interface 403. The power key or power button 518 allows the user to turn the power to the diagnostic tool 510 on and off, as required.

A memory card reader 420 can be a single type card reader, such as, but not limited to, a compact flash card, floppy disk, memory stick, secure digital, flash memory or other type of memory. The memory card reader 420 can be a reader that reads more than one of the aforementioned memory such as a combination memory card reader. Additionally, the memory card reader 420 can also read any other computer readable medium, such as CD (compact disc), DVD (digital video or versatile disc), etc.

The connector interface 411 allows the diagnostic tool 510 to connect to an external device, such as, but not limited to, an ECU (electronic control unit) of a vehicle, a computing device, an external communication device (such as a modem), a network, etc. through a wired or wireless connection. Connector interface 411 can also include connections such as a USB (universal serial bus), FIREWIRE (Institute of Electrical and Electronics Engineers (IEEE) 1394), modem, RS232, RS48J, and other connections to communicate with external devices, such as a hard drive, USB drive, CD player, DVD player, or other computer readable medium devices.

FIG. 7 is a block diagram of the components of the diagnostic tool 510 according to an embodiment of the invention. In FIG. 7, the diagnostic tool 510 according to an embodiment of the invention may include a smart camera 401, a processor 402, a field programmable gate array (FPGA) 414, a first system bus 424, the display 102, a complex programmable logic device (CPLD) 406, the input device in the form of a keypad input circuit 404 (scroll device or the like), a memory subsystem 408, an internal non-volatile memory (NVM) 418 having the database 412, a card reader 420 (optional), a second system bus 422, a connector interface 411, a signal translator 440, a GPS antenna 432, a GPS receiver 434, an optional altimeter 436 and wireless communication circuit 438. A vehicle communication interface 430 of the vehicle under test is in communication with the diagnostic tool 510 through connector interface 411 via an external cable (not shown).

Signal translator 440 may be included and communicates with the vehicle communication interface 430 through the connector interface 411. Signal translator 440 conditions signals received from an ECU unit through the vehicle communication interface 540 to a conditioned signal compatible with diagnostic tool 510. Signal translator 440 can communicate with, for example, the following communication protocols: J1850 (VPM and PWM), ISO 9141-2 signal, communication collision detection (CCD) (e.g., Chrysler collision detection), data communication links (DCL), serial communication interface (SCI), Controller Area Network (CAN), Keyword 2000 (ISO 14230-4), OBD II or other communication protocols that are implemented in a vehicle.

The circuitry to translate and send in a particular communication protocol can be selected by FPGA 414 (e.g., by tri-stating unused transceivers) or by providing a keying device that plugs into the connector interface 411 that is provided by diagnostic tool 510 to connect diagnostic tool 510 to the vehicle communication interface 540. Signal translator 440 may be also coupled to FPGA 414 and the card reader 420 via the first system bus 424. FPGA 414 transmits to and receives signals (i.e., messages) from the ECU unit through signal translator 440.

The FPGA 414 may be coupled to the processor 402 through various address, data and control lines by the second system bus 422. FPGA 414 is also coupled to the card reader 420 through the first system bus 424. The processor 402 may also be coupled to the display 102 in order to output the desired information to the user. The processor 402 communicates with the CPLD 406 through the second system bus 422. Additionally, the processor 402 may be programmed to receive input from the user through the keypad input circuit 404 via the CPLD 406. The CPLD 406 may provide logic for decoding various inputs from the user of the diagnostic tool 510 and also provides glue-logic for various other interfacing tasks.

Memory subsystem 408 and the memory 418 may be coupled to the second system bus 422, which allows for communication with the processor 402 and FPGA 414. Memory subsystem 408 can include an application dependent amount of dynamic random access memory (DRAM), a hard drive, and/or read only memory (ROM). Software to run the diagnostic tool 510 can be stored in the memory subsystem 408 or 418, including any other database. The database 412 can include diagnostic information and other information related to vehicles.

The memory 418 can be an electrically erasable programmable read-only memory (EEPROM), flash ROM, or other similar memory. The memory 418 can provide, for example, storage for boot code, self-diagnostics, various drivers and space for FPGA images, if desired. If less than all of the modules are implemented in FPGA 414, memory 418 can contain downloadable images so that FPGA 414 can be reconfigured for a different group of communication protocols.

A GPS antenna 432 and GPS receiver 434 can be included and may be mounted in or on the housing 512 or any combination thereof. The GPS antenna 432 electronically couples to the GPS receiver 434 and allows the GPS receiver to communicate (detects and decodes signals) with various satellites that orbit the Earth. In one embodiment, the GPS antenna and GPS receiver are one device instead of two. The GPS receiver 434 and GPS antenna 432 may electronically couple to the processor 402, which may be coupled to memory subsystem 408, the memory 418 or a memory card in the card reader 420. The memories can be used to store cartographic data, such as electronic maps. The diagnostic tool can include all the maps for the U.S. (or country of use), North America or can have the region or state where the diagnostic tool is located. In alternative embodiments, the diagnostic tool can have all the maps of the world or any portion of the world desired by the user. This allows the diagnostic tool to be a GPS device so that a driver can drive from one location to another. The maps may be over lay or may incorporate traffic, local events, and location of other GPS devices (smart phones) and other information that can be useful to the technician. By being able to locate other diagnostic tools with GPS, then the technicians may be able to use the diagnostic tools to locate each other in order to conduct a meeting or have a social event.

The GPS receiver communicates with and "locks on" to a certain number of satellites in order to have a "fix" on its global location. Once the location is fixed, the GPS receiver, with the help of the processor, can determine the exact location including longitude, latitude, altitude, velocity of movement and other navigational data of the diagnostic tool 510.

Should the GPS receiver be unable to lock onto the minimum number of satellites to determine the altitude or unable to determine the altitude for any reason, the altimeter 436 can be used to determine the altitude of the diagnostic tool 510. The altimeter 436 is electronically coupled to the processor 402 and can provide the altitude or elevation of the diagnostic tool 510. The altimeter 436 can be coupled to a barometric pressure sensor (not shown) in order to calibrate the elevation measurements determined by the altimeter. The sensor can be positioned interior or exterior to the housing 512 of the diagnostic tool 510. Minor atmospheric pressure changes can affect the accuracy of the altimeter, thus, diagnostic tool can correct for these changes by using the sensor in conjunction with the altimeter along with a correction factor known in the art.

Wireless communication circuit 438 communicates with the processor 402 via the second system bus 422. The wireless communication circuit can be configured to communicate via RF (radio frequency), satellites, cellular phones (analog or digital), Bluetooth®, Wi-Fi, Infrared, ZigBee, Local Area Networks (LAN), WLAN (Wireless Local Area Network), other wireless communication configurations and standards or a combination thereof. The wireless communication circuit 438 allows the diagnostic tool to communicate with other devices wirelessly such as with a remote computing device 500 (FIG. 6) having remote databases. The wireless communication circuit 438 includes an antenna built therein and being housed within the housing 512 or can be externally located on the housing 512.

Figure 8:
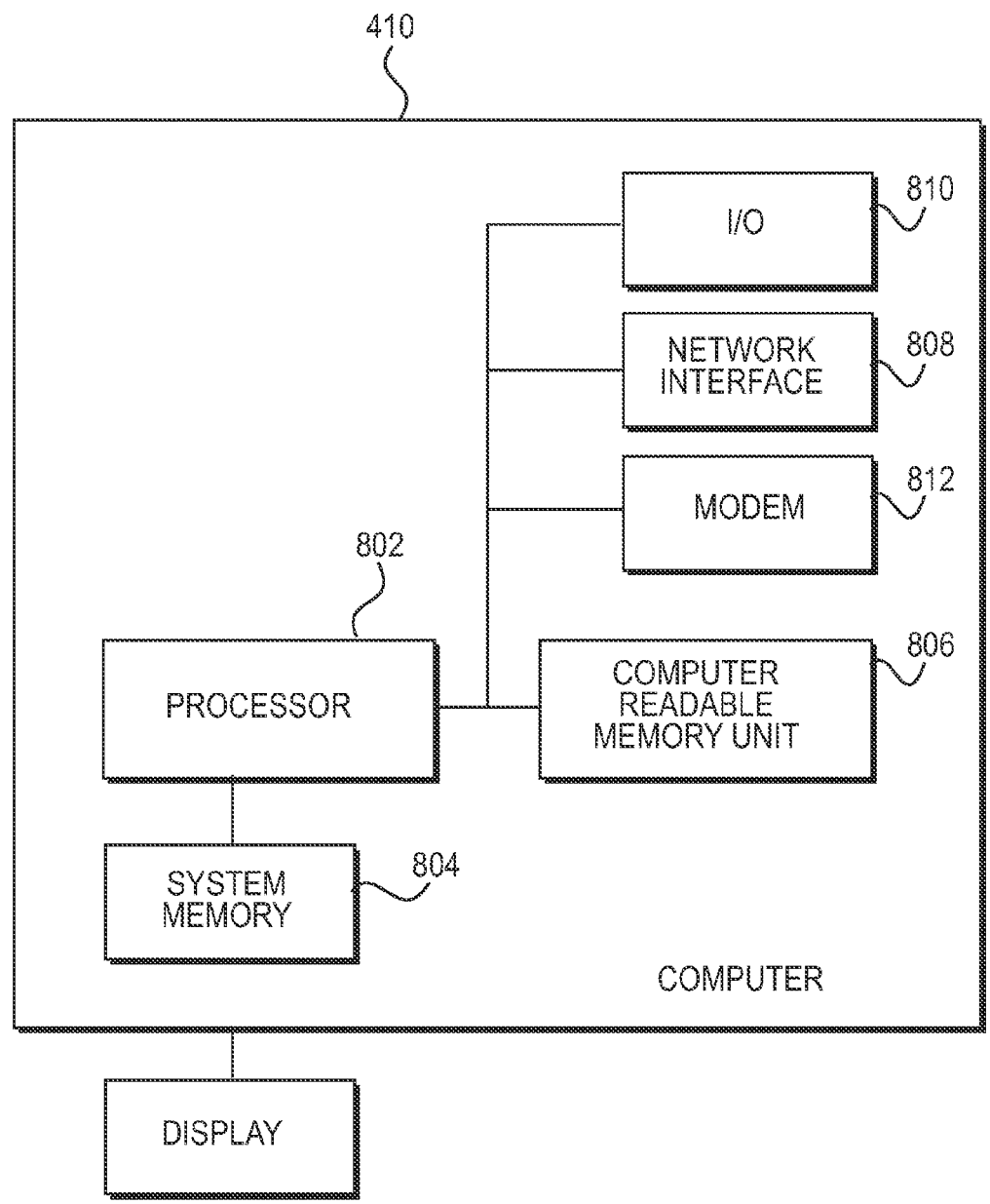
FIG. 8 is a block diagram of an exemplary computer of FIGS. 3 and 4 according to the invention.

Referring to FIG. 8, an example of a personal computer 410, but not limited to this example of the personal computer 410, that can read computer readable media that includes computer-executable instructions of the invention. The personal computer 410 includes a processor 802 that uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output (I/O) interface 810 that accommodate connection to a variety of other devices. Furthermore, the personal computer 410 can output through, for example, the interface 810, data for display on the display 820.

The invention or parts thereof, can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The invention can include the computer-readable medium having stored thereon a data structure including a plurality of fields containing data representing the techniques of the invention.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A secondary power source system for a communication device, comprising:
 a charging unit configured to receive a primary power input and restrict a current used for charging to a predetermined amount, wherein the current is part of a first output of the charging unit;
 a storage unit comprising a device that stores electrical energy, the storage unit configured to receive the first output from the charging unit with restricted current and generate a second output;
 a regulating unit configured to receive the second output from the storage unit and generate a third output, wherein the regulating unit further comprises a boost converter;
 a selector unit configured to perform a logical operation with the primary power input, the first output from the charging unit and the third output from the regulating unit, and to generate a fourth output;
 a shutdown unit configured to shutdown operation of the secondary power source system when the storage unit has been expended, and wherein the shutdown unit is configured to isolate the boost converter from the storage unit; and
 an isolation circuit, wherein the shutdown unit is configured to isolate the boost converter from the storage unit with the isolation circuit,
 wherein the isolation circuit is tied to ground.

2. The secondary power source system of claim 1, wherein the boost converter comprises a shutdown input that is responsive to the shutdown unit.

3. A diagnostic tool comprising a display, a processor, and the secondary power source system of claim 1.

4. A vehicle communication interface comprising the secondary power source system of claim 1.

5. The secondary power source system of claim 1, wherein the device that stores electrical energy includes at least one capacitor.

6. The secondary power source system of claim 1, wherein the device that stores electrical energy includes a plurality of super capacitors in series.

7. The secondary power source system of claim 1, wherein the charging unit comprises a charger that accommodates a restriction of current to the predetermined amount and includes thermal regulation.

8. The secondary power source system of claim 1, wherein a logic circuit of the communication device between a vehicle and a computing device, being any one of a personal computer and a diagnostic tool that provides power with the fourth output.

9. A secondary power source system for a device communicating between a vehicle and a computing device, comprising:
- a charger for charging receiving a primary power input and restricting a current used for charging to a predetermined amount, wherein the current is part of a first output of the charger;
- at least one capacitor being charged by the first output of the charger and generating a second output;
- a voltage regulator generating a third output from the second output from the at least one capacitor and wherein the voltage regulator further comprises a boost converter;
- a selector configured to select between the primary power input, the first output from the charger, and the third output from the voltage regulator, and to generate a single fourth output;
- a shutdown circuit configured to shut down operation of the secondary power source system when the at least one capacitor has been expended and wherein the shutdown circuit is configured to isolate the boost converter from the at least one capacitor; and
- an isolation circuit, wherein the shutdown unit is configured to isolate the boost converter from the storage unit with the isolation circuit,
wherein the isolation circuit is tied to ground.

10. The secondary power source system of claim 9, wherein the boost converter comprises a shutdown input that is responsive to the shutdown circuit.

11. A diagnostic tool comprising a display, a processor, and the secondary power source system of claim 9.

12. A vehicle communication interface comprising the secondary power source system of claim 9.

13. The secondary power source system of claim 9, wherein the at least one capacitor includes a plurality capacitors.

14. A method of providing a secondary power source to a communication device, comprising:
- receiving a primary power input and restricting a current used for charging to a predetermined amount by a charging unit, wherein the current is part of a first output of the charging unit;
- receiving the first output from the charging unit with restricted current and storing a power in a storage unit including a capacitance unit;
- generating a second output by the storage unit;
- receiving the second output from the storage unit by a regulating unit; generating a third output by the regulating unit;
- selecting between the primary power input, the first output from the charging unit, and the third output from the regulating unit to generate a fourth output;
- shutting down operation of the secondary power source with a shutdown unit when the storage unit has been expended and the shutting down operation further includes isolating the regulating unit from voltage fluctuations of the storage unit with the shutdown unit, wherein the isolating further comprises isolating with an isolation circuit; and
- tying the isolation circuit to ground.

* * * * *